United States Patent
Goshorn et al.

[11] Patent Number: 5,918,800
[45] Date of Patent: Jul. 6, 1999

[54] CORNER POST/EDGE PROTECTOR HAVING IMPROVED COLUMN COMPRESSIVE STRENGTH-SHAPED BOARD

[75] Inventors: Douglas A. Goshorn, Lebanon, Ohio; Michael D. Loeschen, Evanston, Ill.

[73] Assignee: Illinois Tool Works Inc., Glenview, Ill.

[21] Appl. No.: 08/890,740

[22] Filed: Jul. 11, 1997

[51] Int. Cl.$^6$ .................................................. B65D 81/06
[52] U.S. Cl. ............................ 229/199; 206/586; 206/453
[58] Field of Search ........................... 229/199; 206/453, 206/586, 597; 217/66, 67, 69; 248/345.1

[56] References Cited

U.S. PATENT DOCUMENTS

| | | | |
|---|---|---|---|
| D. 351,988 | 11/1994 | Gotcher. | |
| 1,865,485 | 7/1932 | Sas. | |
| 3,073,439 | 1/1963 | Symmonds, Jr. | 217/69 |
| 3,315,867 | 4/1967 | Seltman. | |
| 4,120,441 | 10/1978 | Hurley. | |
| 4,202,449 | 5/1980 | Bendt. | |
| 4,244,471 | 1/1981 | Plante | 206/586 |
| 4,483,444 | 11/1984 | Gardner. | |
| 4,742,916 | 5/1988 | Galea | 206/586 |
| 4,877,673 | 10/1989 | Eckel et al. | 206/453 |
| 4,938,357 | 7/1990 | Schmidt. | |
| 5,267,651 | 12/1993 | Hughes | 206/586 |
| 5,385,236 | 1/1995 | Cowan et al. | 206/453 |

FOREIGN PATENT DOCUMENTS

| 40/5170264 | 7/1993 | Japan | 206/586 |
|---|---|---|---|

*Primary Examiner*—Gary E. Elkins
*Attorney, Agent, or Firm*—Schwartz & Weinrieb

[57] ABSTRACT

A corner post/edge protector structure comprises an apex portion, a pair of leg members disposed substantially perpendicular with respect to each other, and concave/convex transitional regions integrally interconnecting the leg members to opposite ends of the apex portion. The concave/convex transitional regions define axially extending strengthening ribs for enhancing the axial or columnar compressive strength characteristics of the structure when the same is used in conjunction with stacks or tiers of packages, containers, or palletized loads. In addition, the transitional regions permit outer and inner surface portions of the leg members to be coplanar with outer and inner surface portions of the apex portion so as to facilitate or enable compact storage of the containers, packages, or palletized loads within cargo holds and storage facilities. Still further, the transitional regions enable the leg members to undergo resilient flexural movements under impressed packaging strapping loads or forces and facilitate favorable distribution of the strapping loads or forces.

17 Claims, 1 Drawing Sheet

5,918,800

CORNER POST/EDGE PROTECTOR HAVING IMPROVED COLUMN COMPRESSIVE STRENGTH-SHAPED BOARD

FIELD OF THE INVENTION

The present invention relates generally to corner post and edge protector structures for protecting the corner or edge regions of packages, articles, products, and/or palletized loads thereof, as well as for providing necessary columnar compressive strength characteristics in connection with the stacking of such articles or products, or palletized loads thereof, during shipping or storage operations, and more particularly to a corner post and edge protector structure which is uniquely constructed so as to provide enhanced columnar strength characteristics, particularly within the apex region of the corner post or edge protector, as well as to provide minimized spacing requirements or dimensions, as measured substantially perpendicularly outwardly from side surfaces of the articles or products, or palletized loads thereof, so as to in turn maximize the number of articles or products, or palletized loads thereof, which may be accommodated within a predetermined cargo space during either shipping or storage operations.

BACKGROUND OF THE INVENTION

Corner post and edge protector structures are of course well-known in the packaging and shipping industries, and accordingly, such structures are widely used in connection with the shipping or storage of various packages, articles, products, or palletized loads thereof, in order to not only protect the same during transit, wherein it is particularly desirable to protect the corner or edge portions or regions thereof, but in addition, to provide columnar compressive strength characteristics in order to permit such packages, articles, products, and palletized loads thereof to be vertically stacked within cargo holds or storage facilities without undergoing or experiencing compressive strength failures.

The prior art is of course replete with various different types of corner post and edge protector structures, and examples of such prior art structures are disclosed within U.S. Pat. No. 4,938,357 which issued to Schmidt on Jul. 3, 1990, U.S. Pat. No. 4,483,444 which issued to Gardner on Nov. 20, 1984, U.S. Pat. No. 4,202,449 which issued to Bendt on May 13, 1980, U.S. Pat. No. 4,120,441 which issued to Hurley on Oct. 17, 1978, U.S. Pat. No. 3,315,867 which issued to Seltman on Apr. 25, 1967, U.S. Pat. No. 1,865,485 which issued to Sas on Jul. 4, 1932, and U.S. Design Pat. No. D-351,988 which issued to Gotcher on Nov. 1, 1994. While all of the structures disclosed within the aforenoted prior art patents admittedly provide the requisite corner or edge protection, or corner post support, it appears that the device of Bendt, which is constructed and disclosed as an edge protector, and not as a corner post structure for providing columnar stacking strength or support, is most similar, from a structural point of view, to the corner post/edge protector of the present invention, although as will be readily apparent from the disclosure presented hereinafter, important structural, and therefore operationally functional, differences exist between the corner post/edge protector of the present invention and the edge protector device of Bendt.

Referring to FIG. 1 of the present patent application drawings, which corresponds substantially to FIG. 1 of the Bendt patent, it is seen that the edge protector device of Bendt comprises a plastic extrusion which comprises a cylindrical vertex portion 1 defined about an axis 2 and having an arcuate extent which extends approximately three-quarters of a circle or 270 degrees. The ends of vertex portion 1, which are in effect disposed at 0 degree and 270 degree positions as would be considered with respect to a 360 degree plot, terminate at integrally formed side members 3 and 4 which are disposed substantially perpendicular to each other, and the free or distal ends of the sides 3 and 4 terminate in outwardly turned end portions 5 and 6. When the edge protector is secured upon or around an object, article, or package by means of rope or lashing 8, the side members 3 and 4 are disposed in surface contact with the side surfaces 7,7 of the object, article, or package.

It is noted, however, that the device of Bendt comprises an edge protector structure for packages, articles, or objects, and is not constructed as a corner post structure which must necessarily provide or exhibit substantial compression or columnar strength characteristics in order to withstand multi-tiered vertical stacking of articles, objects, packages, and palletized loads. In addition, due to offset of each one of the sides 3 and 4 of the edge protector of Bendt with respect to the vertex portion 1 thereof, as defined, for example, between the outer surface 3a of, for example, the side or leg member 3 and the outer surface portion 1a of the vertex region 1, taken within a plane disposed parallel to the outer surface 3a, and as illustrated in FIG. 1 by means of the double-arrowheads and the distance or space labelled OFFSET, adjacent packages, articles, or palletized loads are not capable of being closely spaced with respect to each other. Accordingly, transportation cargo hold or storage facility space is not able to be used in a cost-effective manner.

A need therefore exists in the art for a corner post structure, which may also serve as an edge or corner protector for corner or edge regions of articles, objects, packages, or palletized loads, wherein such structure exhibits enhanced columnar stacking strength characteristics while permitting relatively close spacing between adjacent side portions of the various packages, objects, articles, or palletized loads with which the corner post structure is operatively associated. In addition, the corner post structure should also exhibit a requisite amount of lateral stability, and in addition, provide positive or desirable stress distribution characteristics with respect to the stresses or forces normally impressed by means of the packaging strapping or lashing upon the packages, articles, objects, or palletized loads.

OBJECTS OF THE INVENTION

Accordingly, it is an object of the present invention to provide a new and improved corner post/edge protector structure for use in connection with packages, objects, articles, and palletized loads thereof.

Another object of the present invention is to provide a new and improved corner post/edge protector structure for use in connection with packages, objects, articles, and palletized loads thereof which overcomes the various disadvantages and drawbacks characteristic of the prior art corner post and edge protector structures.

A further object of the present invention is to provide a new and improved corner post/edge protector structure for use in connection with packages, objects, articles, and palletized loads thereof which exhibits enhanced columnar compression or stacking strength characteristics while permitting cost-effective cargo hold or storage facility accommodation of such packages, objects, articles, or palletized loads thereof. In addition, the corner post/edge protector structure of the present invention provides desirable stress or force distribution characteristics with respect to the forces or stresses normally impressed upon the packages or articles or palletized loads by means of the packaging strapping or lashing.

SUMMARY OF THE INVENTION

The foregoing and other objects are achieved in accordance with the principles and teachings of the present invention through the provision of a new and improved corner post/edge protector structure for use in connection with packages, articles, objects, and/or palletized loads thereof wherein the corner post/edge protector structure comprises a vertex portion which spans an angular extent of approximately 270 degrees, and a pair of leg members which are disposed at substantially 90 degrees with respect to each other. The leg members are integrally connected to terminal ends of the vertex portion by means of reverse or substantially U-shaped bend portions. These reverse or substantially U-shaped bend portions serve several functions.

Firstly, such U-shaped bend portions, in effect, define axially extending rib members which, in addition to the columnar strength characteristics developed or generated by the vertex portion, provided additional columnar strength characteristics for the corner post structure within the vertex region thereof. Secondly, such bend portions enable the inner and outer surfaces of the leg members to be disposed, in effect, in a coplanar manner with respect to the innermost and outermost surface regions of the vertex portion such that the aforenoted offset, defined between, for example, such outer surfaces of the leg members and the outermost surface regions of the vertex portion of the prior art edge protector device of Bendt, is eliminated. Such elimination of this offset permits enhanced compactness with respect to the accommodation of packages, palletized loads, and the like within cargo holds or storage facilities. Thirdly, such bend portions provide the corner post structure or implement of the present invention with a requisite amount of flexibility, particularly when disposed around an edge or corner region of an article, package, or palletized load, and secured in such position by suitable packaging strapping or lashing such that favorable force or stress distribution characteristics, as defined between the package, article, or palletized load, and the packaging strapping or lashing, are achieved.

BRIEF DESCRIPTION OF THE DRAWINGS

Various other objects, features, and attendant advantages of the present invention will be more fully appreciated from the following detailed description when considered in connection with the accompanying drawings wherein like or corresponding parts are designated by similar reference characters throughout the several views, and wherein further.

DETAILED DESCRIPTION OF THE PREFERRED EMBODIMENT

Figure 1:
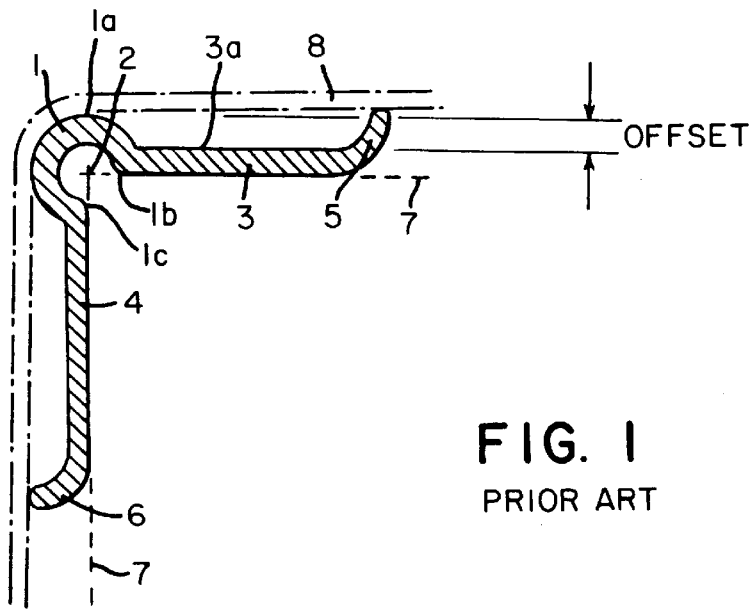
FIG. 1 is a cross-sectional view of a PRIOR ART edge protector showing its use in connection with the application of the same to the corner or edge region of an article and wherein the edge protector is secured to the article by suitable lashing.
Figure 2:
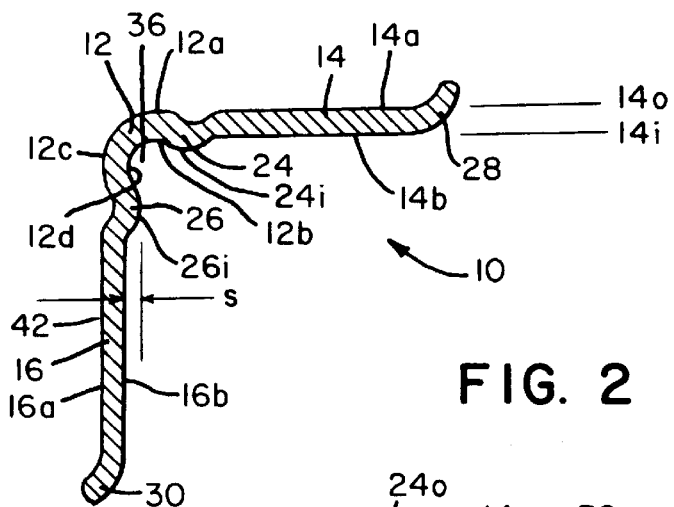
FIG. 2 is a cross-sectional view of the new and improved corner post/edge protector structure constructed in accordance with the principles and teachings of the present invention and showing the cooperative parts thereof.
Figure 3:
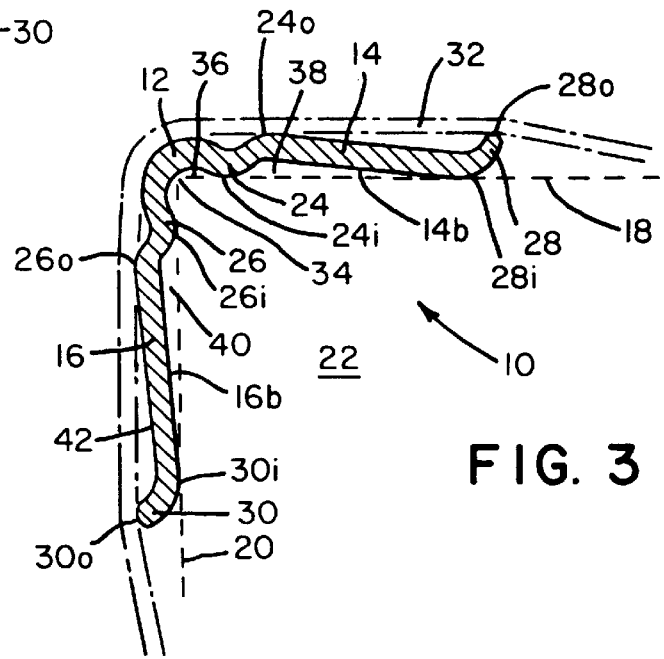
FIG. 3 is a cross-sectional view, similar to that of FIG. 1, showing, however, the use of the new and improved corner post/edge protector of the present invention, and as illustrated in FIG. 2, when the same is applied to and secured around an edge or corner region of an article by suitable packaging strapping or lashing.

Referring again to the drawings, and more particularly to FIG. 2 thereof, the new and improved corner post and edge protector developed and constructed in accordance with the teachings and principles of the present invention is illustrated and generally designated by the reference character 10. As is the case with the edge protector of Bendt as illustrated in FIG. 1, the corner post/edge protector structure 10 of the present invention comprises a vertex portion 12 which has an arcuate configuration and which extends over an arcuate or angular range comprising substantially three-quarters of a circle or 270 degrees. As was also characteristic of the Bendt edge protector, the terminal ends of the vertex portion 12 of the corner post/edge protector 10 of the present invention are integrally connected to a pair of leg members 14 and 16 which are disposed substantially perpendicular to each other so as to operatively engage, contact, or be seated upon adjacent sides 18 and 20 of a package, article, object, or palletized load 22 as illustrated in FIG. 3.

However, contrary to the edge protector of Bendt wherein the side or leg members 3 and 4 are integrally connected directly to the vertex portion 1 at the terminal end portions of the vertex portion 1, as denoted at 1b and 1c, as a result of which the aforenoted OFFSET spacing between the external surface 3a of the side member 3 and the outermost external surface portion 1a of the vertex portion 1 is developed, the side or leg members 14 and 16 of the corner post or edge protector 10 of the present invention are integrally connected to the terminal end portions of the vertex portion 12 by means of transitional regions 24 and 26 which have reversely bent radiused portions whereby the transitional regions 24 and 26 have substantially U-shaped configurations. As will become apparent, these transitional regions 24 and 26 serve critically important roles in connection with the corner post or edge protector structure 10 characteristic of the present invention. The leg or side members 14 and 16 have outwardly turned or arcuately extending terminal, free, or distal end portions 28 and 30 which, as will also become apparent, likewise serve or have several operative functions in connection with the corner post/edge protector 10 of the present invention.

In connection with the transitional regions 24 and 26 respectively integrally interconnecting the vertex portion 12 and the leg or side members 14 and 16 of the corner post or edge protector 10 of the present invention, a first important operative role or function that such transitional regions 24 and 26 play or serve is that of longitudinally or axially extending strengthening ribs. As is well-known in the art, that is, the transportation or storage facility industries in connection with the shipping or storage of cargo loads, containers, or the like, when such cargo loads, containers, pallets, or the like, are vertically stacked, most of the columnar stacking strength or compressive loading is concentrated within or at the apex or vertex region 12. However, by providing the longitudinally or axially extending ribs, as defined by means of the transitional regions 24 and 26, the compressive forces, loads, or stresses attendant the stacking of the cargo loads, containers, pallets, or the like, are effectively redistributed such that the forces or loads from the single location at the vertex or apex region 12 are now distributed or dispersed to the three locations as defined by the vertex or apex region 12 and the transitional rib regions 24 and 26. Accordingly, the overall compressive or columnar stacking strength exhibited by the corner post/edge protector 10 is substantially greater than that exhibited by conventional or prior art corner posts.

A second important function or operative role that the provision of the reversely bent, substantially U-shaped transitional regions 24 and 26 serve or play is to render the corner post/edge protector structure relatively compact such that substantially increased cargo loading or storage within a cargo hold or storage facility of a predetermined size is able to be achieved. As can be readily appreciated as a result of reference being made to FIG. 2, for example, the vertex or apex portion 12 includes an outermost surface portion 12a which is defined by means of a line tangent to vertex or apex portion 12 and disposed parallel to the side or leg member 14, and in a similar manner, the side or leg member 14 includes an outermost surface portion 14a.

By providing the reversely bent, substantially U-shaped transitional region 24, it is seen that the outermost surface portions 12a and 14a are in effect coplanar as illustratively indicated by means of the line 14o. Consequently, the OFFSET characteristic of the edge protector of Bendt has in effect been eliminated. The same coplanar relationship exists between innermost surface portion 12b of apex portion 12, which is defined by means of a line tangent to the inner radiused surface of apex portion 12 and disposed parallel to the side or leg member 14, and the innermost surface portion 14b of the side or leg member 14, wherein such coplanar relationship is denoted by means of the line 14i. Similar compact relationships are likewise defined between the respective outermost and innermost surface portions 12c and 12d of the vertex portion 12 and the outermost and innermost surface portions 16a and 16b of the leg or side member 16, the coplanar relationship lines having not been illustrated or designated by reference characters, although of course it is submitted that such can be readily appreciated.

A third operative function or role that the transitional regions 24 and 26 serve or play in connection with the corner post/edge protector 10 of the present invention is to provide for the favorable distribution of stresses or loads which are imparted to the package, article, or palletized load 22 by means of the packaging strapping, lashing, or stretch film 32, as well as to provide the leg or side members 14 and 16 with an inherent degree of flexibility and resiliency which also favorably affects or somewhat controls the distribution of the packaging strapping stresses, forces or loads impressed upon the package, article, or palletized load, particularly within the vicinity of the corner or edge 34 of the package, article, or load 22, or along the sides 18 and 20 thereof.

More particularly, due to the reversely bent configurations of the U-shaped transitional regions 24 and 26, innermost surface portions 24i and 26i of the transitional regions 24 and 26 are offset or are disposed inwardly with respect to the innermost surface portions 14b and 16b of the leg or side members 14 and 16, as denoted by the double-arrowed space s, and accordingly, such innermost surface portions 24i and 26i engage, abut, or contact the sides 18 and 20 of the package, article, or palletized load 22 at locations removed or remote from the corner or edge 34 of the package, article, or palletized load 22. The corner or edge portion 34 of the package, article, or palletized load 22 is also seen to be housed or accommodated within the concave recess or space 36 defined by means of the vertex or apex portion 12 of the corner post or edge protector structure 10 such that vertex or apex portion 12 of the corner post/edge protector structure 10 does not engage or contact the corner or edge portion 34 of the article, package, or palletized load 22, or at worst, the vertex or apex portion 12 of the corner post/edge protector 10 contacts or engages the corner or edge portion 34 of the package, article, or palletized load 22 with only minimal or reduced forces or loads, even when the packaging strapping or film 32 is secured about the package or palletized load 22.

As can be best appreciated from FIG. 3, when the packaging strapping, lashing or stretch film 32 is secured around the package, article, or palletized load 22, the film or strapping 32 is of course routed around the external surfaces of the apex or vertex portion 12 of the corner post/edge protector 10 and also engages outermost surface portions 28o and 30o of the terminal, free, or distal end portions 28 and 30 of the side or leg members 14 and 16. Accordingly, when the strapping or film 32 is tensioned and secured, the contact or engagement defined between the film or strapping 32 and the terminal, free, or distal end portions 28 and 30 of the side or leg members 14 and 16 causes the side or leg members 14 and 16 to be moved or resiliently flexed inwardly toward their respective sides 18 and 20 of the package or palletized load 22 such that the side or leg members 14 and 16 are no longer disposed substantially perpendicular to each other.

Such resilient, flexural movement of the side or leg members 14 and 16 is permitted by means of the aforenoted offset s, as defined between the innermost surface portions 24i and 26i of the transitional regions 24 and 26, and the innermost surface portions 14b and 16b of the side or leg members 14 and 16, and occurs around the innermost surface portions 24i and 26i which in effect serve as fulcrums. Accordingly, such flexural movement of the side or leg members 14 and 16 also results in innermost surface portions 28i and 30i of the terminal or distal end portions 28 and 30 of the side or leg members 14 and 16 engaging or contacting the sides 18 and 20 of the package or palletized load 22 at locations remote from the contact or engagement locales defined by the fulcrum innermost surface portions 24i and 26i of the transitional regions 24 and 26. Air spaces 38 and 40 are also defined between the innermost surface portions 14b and 16b of the side or leg members 14 and 16, respectively, and the sides 18 and 20 of the package, article, or palletized load 22 which also serve to permit the aforenoted flexure and/or resilient movement of the side or leg members 14 and 16 with respect to the sides 18 and 20 of the package, article, or palletized load 22. Still further, outermost surface portions 24o and 26o of the transitional regions 24 and 26, which serve as component parts integrally interconnecting the transitional regions 24 and 26 to the side or leg members 14 and 16, are now also disposed in contact with the packaging strapping, lashing, or stretch film 32.

Accordingly, the tension or strapping loads, forces, or stresses, generated by the packaging strapping, lashing or film 32 and impressed upon or transmitted to the corner post or edge protector 10 and the sides 18 and 20 of the package, article, or palletized load 22, are favorably distributed to multiple locations as defined or determined, for example, by vertex or apex portion 12, innermost transitional surface portions 24i and 26i, outermost transitional surface portions 24o and 26o, innermost distal end surface portions 28i and 30i, and outermost distal end surface portions 28o and 30o. It is lastly noted that the provision of the outwardly turned or arcuate extending terminal, free, or distal end portions 28 and 30 of the side or leg members 14 and 16 also serve to provide lateral stability to the corner post structure 10 when the structure is subjected, for example, to vertically oriented or directed columnar stacking loads.

The corner post/edge protector structure 10 constructed in accordance with the various teachings and principles of the present invention may be used in connection with various different packages, articles, palletized loads, and the like, in order to provide the desired columnar stacking strength for such packages, articles, and palletized loads. Accordingly, the structure 10 may be manufactured so as to have different axial length dimensions, as well as to be fabricated from various different materials so as to exhibit various service characteristics under different service environments. For example, the corner post/edge protector structure 10 is usually manufactured so as to have an axial length dimension of between thirty inches (30") and fifty inches (50") with the average axial length of the structure being approximately forty inches (40"). The preferred axial length dimension of such structure 10 is usually either thirty-six inches (36") or three feet, or forty-eight inches (48") or four feet.

In addition, it is noted that the corner post/edge protector structure 10 may be fabricated either from suitable paper materials, plastic materials, or a combination of paper and plastic materials. When fabricated entirely from paper materials, the corner post/edge protector structure 10 is fabricated as a laminate from a plurality of paper plies comprising a composite of paper particles, and such a corner post/edge protector structure is normally preferred in view of the fact that such a corner post/edge protector structure exhibits maximized columnar compressive or stacking strength characteristics as compared to a similar structure fabricated either from suitable plastic materials or a combination of paper and plastic materials. A laminated paper corner post/edge protector structure is also preferred as compared to a similar structure fabricated entirely from plastic materials because the paper structure may be manufactured in a more cost-effective manner than that necessary in connection with the manufacture of a plastic corner post/edge protector in view of the fabrication techniques required in connection with the manufacture of such plastic corner post/edge protector structures.

On the other hand, certain cargo hold or storage facility environments require or effectively mandate the use of corner post/edge protector structures which are fabricated from a combination of paper and plastic materials wherein the materials are mixed or ground together into a composite, the mass of materials is then heated so as to melt the plastic material constituent, and the resulting material mass is extruded so as to achieve the corner post/edge protector structure 10 of the present invention. Good results have been achieved when the plastic material comprises up to approximately fifty percent (50%) by weight of the composite material mass. The plastic material serves in effect as a moisture barrier so as to provide the corner post/edge protector structure 10 with a requisite amount of moisture resistance under damp environmental conditions.

It is lastly noted that in addition to the basic corner post/edge protector structure 10 and its various component parts as illustrated in the drawings, in order to add still yet additional columnar compressive strength characteristics to the structure 10, the latter may optionally include a paper wrapping layer 42 disposed about the entire exterior of the structure 10 so as to completely envelop the same. This layer is different from the layers or plies which may comprise the apex portion 12, the leg members 14 and 16, and the transitional regions 24 and 26 in that such portions or regions are fabricated from multiple paper plies which extend from, for example distal end 28 to distal end 30, however, wrapping layer 42 comprises a wrapping layer which, for example, commences upon the inner surface portion of distal end 28, covers all inner surface portions of the leg member 14, transitional region 24, apex portion 12, transitional region 26, leg member 16, and distal end 30, is then wrapped around distal end 30, covers all outer surface portions of leg member 16, transitional region 26, apex portion 12, transitional region 24, leg member 14, and is then wrapped around distal end 28.

Thus, it may be seen that in accordance with the teachings and principles of the present invention, a new and improved corner post/edge protector has been developed which provides enhanced columnar stacking strength characteristics, enables more compact warehousing of articles, packages, or palletized loads within cargo holds and storage facilities, and provides for the favorable distribution of loads, forces, and stresses attendant packaging strapping or lashing when the latter elements are secured around the packages, articles or palletized loads.

Obviously, many modifications and variations of the present invention are possible in light of the above teachings. It is therefore to be understood that within the scope of the appended claims, the present invention may be practiced otherwise than as specifically described herein.

We claim:

1. A corner post structure for use in connection with corner and edge regions of packages and containers in order to provide enhanced columnar stacking strength in connection with multiple layers and tiers of stacked packages and containers, comprising:

an apex portion adapted to be disposed around a corner region of a container when said structure is disposed adjacent to the corner region of the container, and having a substantially arcuate configuration disposed around an axis and extending over an angular extent of approximately 270 degrees;

a pair of leg members disposed substantially perpendicular with respect to each other and adapted to engage side portions of a container when said structure is secured about the container; and reversely-bent, substantially U-shaped transitional regions defining axially extending strengthening rib means for enhancing columnar compressive strength characteristics of said corner post structure and for integrally interconnecting together said apex portion and said pair of leg members;

said apex portion comprises a pair of outer surface portions and a pair of inner surface portions;

each one of said pair of leg members comprises an outer surface portion which is disposed substantially parallel to and coplanar with a respective one of said outer surface portions of said apex portion, and an inner surface portion which is disposed substantially parallel to and coplanar with a respective one of said inner surface portions of said apex portion;

each one of said transitional regions comprises a convexly configured inner surface portion disposed interiorly of said corner post structure, and a concavely configured outer surface portion disposed exteriorly of said corner post structure; and said convexly configured inner surface portion of each one of said transitional regions is offset a predetermined distance with respect to said inner surface portion of a respective one of said pair of leg members such that when said corner post structure is secured about the container, each one of said convexly configured inner surface portions of said transitional regions will engage a side portion of the container and define a fulcrum portion about which a respective one of said leg members will be flexibly moved toward a side portion of the container such that an inner surface portion of a terminal end portion of each leg member will engage the side portion of the container.

2. The corner post structure as set forth in claim 1, wherein:

each one of said terminal end portions of said leg members comprises an arcuately configured, outwardly turned portion for providing lateral stability to said corner post structure when said corner post structure is subjected to axial columnar compressive loads.

3. The corner post structure as set forth in claim 1, wherein:

said outer surface portions of said apex portion comprise first and second stress distribution points with respect to tension forces impressed thereon by packaging strapping disposed around said apex portion of said corner post structure so as to secure said corner post structure around the corner region of the container;

said transitional regions comprise outer surface portions which comprise third and fourth stress distribution points with respect to tension forces impressed thereon by the packaging strapping; and said terminal end portions of said leg members comprise fifth and sixth stress distribution points with respect to tension forces impressed thereon by the packaging strapping.

4. The corner post structure as set forth in claim 1, wherein:

said outer surface portions of said apex portion comprise first and second stress distribution points with respect to tension forces impressed thereon by packaging film disposed around said apex portion of said corner post structure so as to secure said corner post structure around the corner region of the container;

said transitional regions comprise outer surface portions which comprise third and fourth stress distribution points with respect to tension forces impressed thereon by the packaging film; and said terminal end portions of said leg members comprise fifth and sixth stress distribution points with respect to tension forces impressed thereon by the packaging film.

5. The corner post structure as set forth in claim 1, wherein:

said corner post structure is fabricated from a plurality of paper plies.

6. The corner post structure as set forth in claim 1, wherein:

said corner post structure is fabricated from a plastic material.

7. The corner post structure as set forth in claim 1, wherein:

said corner post structure is fabricated from a mixture composite comprising paper particles and a plastic material.

8. The corner post structure as set forth in claim 1, further comprising:

a paper wrapping disposed about said corner post structure so as to entirely encase said pair of leg members, said apex portion, and said transitional regions.

9. A corner post structure for use in connection with corner and edge regions of packages and containers in order to provide enhanced storage space compactness in connection with the disposition and storage of packages and containers within cargo hold and storage facilities, comprising:

an apex portion adapted to be disposed around a corner region of a container when said structure is disposed adjacent to the corner region of the container, having a substantially arcuate configuration disposed around an axis and extending over an angular extent of approximately 270 degrees, and having a pair of outer surface portions and a pair of inner surface portions;

a pair of leg members disposed substantially perpendicular with respect to each other and adapted to engage side portions of a container when said structure is secured about the container, each one of said pair of leg members comprising an outer surface portion and an inner surface portion; and reversely-bent, substantially U-shaped transitional regions integrally interconnecting together said apex portion and said pair of leg members such that said outer surface portions of said leg members are disposed substantially parallel to and coplanar with a respective one of said outer surface portions of said apex portion, and said inner surface portions of said leg members are disposed substantially parallel to and coplanar with a respective one of said inner surface portions of said apex portion;

said reversely-bent, substantially U-shaped transitional regions define concave outer/convex inner axially extending strengthening rib means for enhancing columnar compressive strength characteristics of said corner post structure in connection with multiple layers and tiers of stacked packages and containers; and said convexly configured inner surface portion of each one of said transitional regions is offset a predetermined distance with respect to said inner surface portion of a respective one of said pair of leg members such that when said corner post structure is secured about the container, each one of said convexly configured inner surface portions of said transitional regions will engage a side portion of the container and define a fulcrum portion about which a respective one of said leg members will be flexibly moved toward a side portion of the container such that an inner surface portion of a terminal end portion of each leg member will engage the side portion of the container, whereby compactness of said corner post structure is achieved while said apex portion is disposed around the corner region of the container and said leg members are engaged with side portions of the container.

10. The corner post structure as set forth in claim 9, wherein:

each one of said terminal end portions of said leg members comprises an arcuately configured, outwardly turned portion for providing lateral stability to said corner post structure when said corner post structure is subjected to axial columnar compressive loads.

11. The corner post structure as set forth in claim 9, wherein:

said outer surface portions of said apex portion comprise first and second stress distribution points with respect to tension forces impressed thereon by packaging strapping disposed around said apex portion of said corner post structure so as to secure said corner post structure around the corner region of the container;

said transitional regions comprise outer surface portions which comprise third and fourth stress distribution points with respect to tension forces impressed thereon by the packaging strapping; and said terminal end portions of said leg members comprise fifth and sixth stress distribution points with respect to tension forces impressed thereon by the packaging strapping.

12. The corner post structure as set forth in claim 9, wherein:

said outer surface portions of said apex portion comprise first and second stress distribution points with respect to tension forces impressed thereon by packaging film disposed around said apex portion of said corner post structure so as to secure said corner post structure around the corner region of the container;

said transitional regions comprise outer surface portions which comprise third and fourth stress distribution points with respect to tension forces impressed thereon by the packaging film; and said terminal end portions of said leg members comprise fifth and sixth stress distribution points with respect to tension forces impressed thereon by the packaging film.

13. The corner post structure as set forth in claim 9, wherein:

said corner post structure is fabricated from a plurality of paper plies.

14. The corner post structure as set forth in claim 9, wherein:

said corner post structure is fabricated from a plastic material.

15. The corner post structure as set forth in claim 9, wherein:

said corner post structure is fabricated from a mixture composite comprising paper particles and a plastic material.

16. The corner post structure as set forth in claim 15, wherein:

said plastic material comprises 50% by weight of said mixture composite.

17. The corner post structure as set forth in claim 9, further comprising:

paper wrapping disposed about said corner post structure so as to entirely encase said pair of leg members, said apex portion, and said transitional regions.

* * * * *